(No Model.)
J. WILKES.
GLOBE VALVE.
No. 498,496. Patented May 30, 1893.
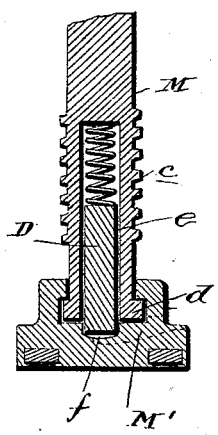
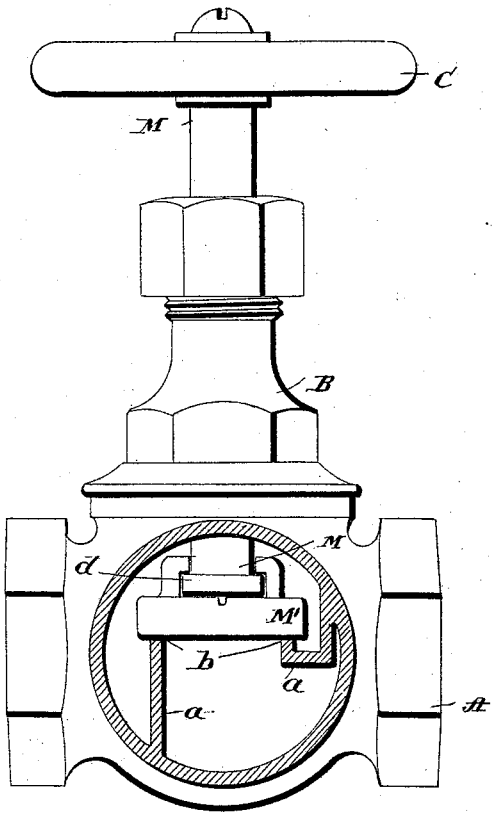
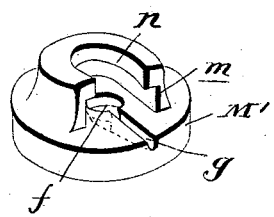
Witnesses:
Inventor:
James Wilkes
By James Sheehy
Attorney

UNITED STATES PATENT OFFICE.

JAMES WILKES, OF SOUTH ST. PAUL, MINNESOTA.

GLOBE-VALVE.

SPECIFICATION forming part of Letters Patent No. 498,496, dated May 30, 1893.

Application filed August 29, 1892. Serial No. 444,461. (No model.)

*To all whom it may concern:*

Be it known that I, JAMES WILKES, a citizen of the United States, residing at South St. Paul, in the county of Dakota and State of Minnesota, have invented certain new and useful Improvements in Globe-Valves; and I do declare the following to be a full, clear, and exact description of the invention, such as will enable others skilled in the art to which it appertains to make and use the same.

My invention has relation to improvements in globe valves, and it has for its general object to detachably connect the spindle and the disk in a simple and secure manner.

Another object of the invention is to provide a disk of such construction that a tool or instrument may be readily introduced to effect a disconnection of the disk and spindle, and a further object of the invention is to cushion the disk and yieldingly hold the same upon its seat to prevent the objectionable hammering movement so often experienced when the steam is passing through the valve.

With the foregoing ends in view the novelty of the invention will be fully understood from the following description and claims when taken in connection with the annexed drawings in which—

Figure 1, is an elevation of a valve embodying my invention, the body being broken away to illustrate the interior construction. Fig. 2, is a detail, vertical, diametrical section of the disk and spindle connected together, and Fig. 3, is a perspective view of the disk.

Referring by letter to the said drawings:—A, indicates the body of a valve, which is provided with suitable partition walls $a$, to form the valve seat $b$; and B, indicates the bonnet which may be formed integral with or suitably connected to the body. This bonnet B, which may be packed in any approved manner, is provided at a suitable point in its length with interior threads (not shown) for the engagement of the exteriorly threaded portion $c$, of the rotary spindle M, which may be rotated through the medium of the operating piece C, or in any other approved manner to open and close the valve.

Formed in the lower end of the valve spindle M, which is shouldered as at $d$, is a longitudinal bore $e$, in which is placed the spring backed locking key D. This key D, which is capable of vertical movement, normally depends below the lower end of the stem M, by reason of the spring pressure, and it is designed to take into the seat $f$, formed in the upper side of the valve disk M', to lock the disk in its connected position as will be presently set forth. Formed upon the upper side of the disk M', and partly surrounding the seat $f$, is an approximately U-shaped wall $m$, which is provided at its upper edge with an inwardly directed flange $n$, designed and adapted to engage the shoulder $d$, of the spindle when the lower end of said spindle is seated within the wall of the disk. To connect the disk M', and the spindle M, it is only necessary to slightly raise the key D, and slide the disk sidewise until the shouldered end of the spindle rests within the wall $m$, when the key will be forced down into the seat $f$, and will securely lock the disk against lateral movement which is the only way that said disk can be moved to disconnect it from the spindle.

In order that the disk may be readily disconnected from the spindle when desirable, I have provided the radial channel $g$, in the disk M', through which a suitable tool or instrument may be introduced to raise the key D, and release the disk. Thus it will be perceived that while the disk is securely locked against casual disconnection, it may be readily removed and replaced when desired.

By reason of the spring backed key bearing down upon the disk M' it will be seen that the said key is cushioned and that a hammering of the disk during the passage of steam will be effectually prevented.

Although I prefer in practice to use a spring for backing the key D, I do not desire to be confined to the same as when my improvements are embodied in valves resting in vertical positions, as illustrated, the key will take into the seat by reason of gravity without the assistance of a spring.

Having described my invention, what I claim is—

1. In a valve, substantially as described, the combination with a disk, having a seat in its upper side and the wall surrounding the seat and having an inwardly directed flange; of the valve spindle having a shoulder at its lower end and a longitudinal bore, the key seated in the bore of the spindle and adapted to engage the seat of the disk, and a spring backing the key, substantially as and for the purpose set forth.

2. In a valve, substantially as described, a valve spindle carrying a key, and a spring backing the key in combination with a disk having a seat to receive the key of the spindle, and a suitable means for holding the disk to the stem, substantially as and for the purpose set forth.

3. In a valve, substantially as described, a valve spindle, carrying a key, and a spring backing the key, in combination with a disk having a seat to receive the key of the spindle and a channel leading from said seat to permit of the introduction of a tool to raise the key, and a suitable means for holding the disk to the spindle, substantially as specified.

In testimony whereof I affix my signature in presence of two witnesses.

JAMES WILKES.

Witnesses:
J. J. FLANAGAN,
D. W. RINGER.